Patented July 19, 1927.

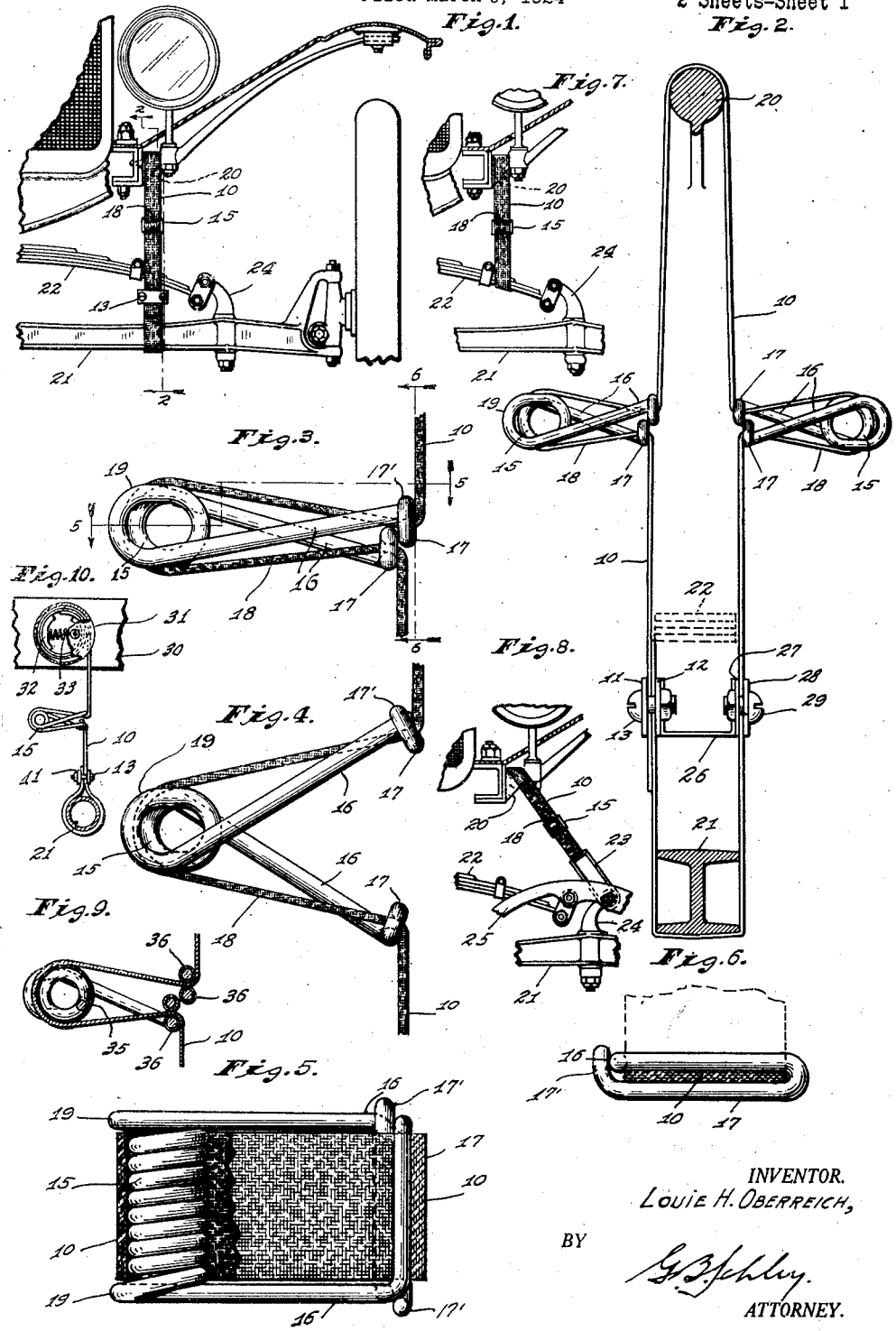

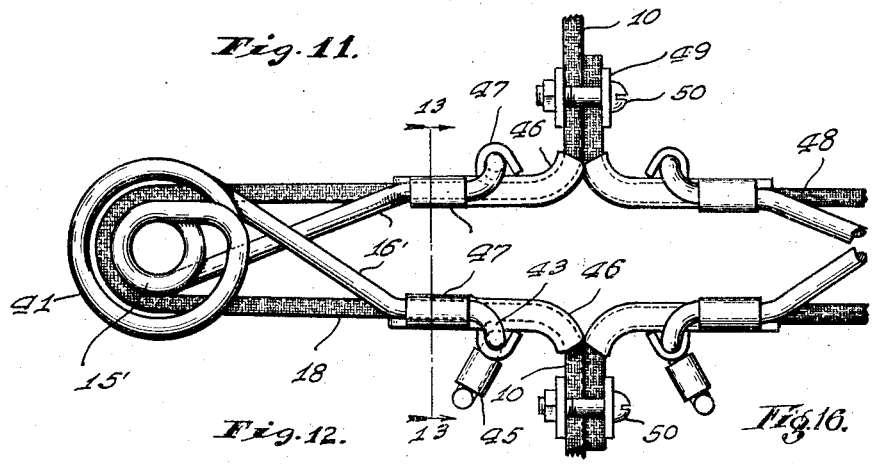
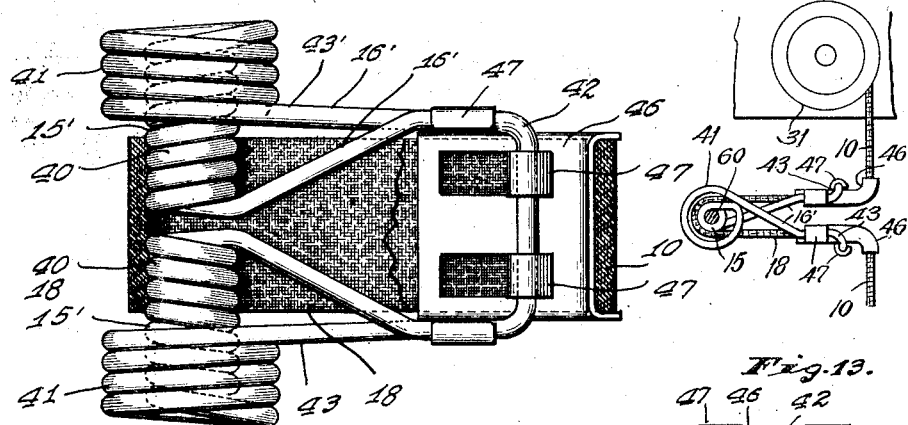
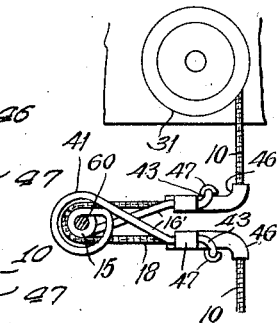
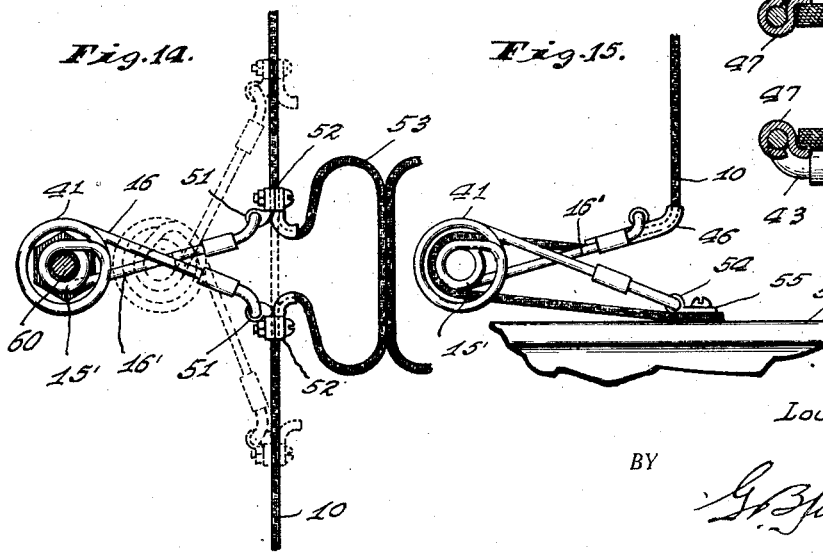
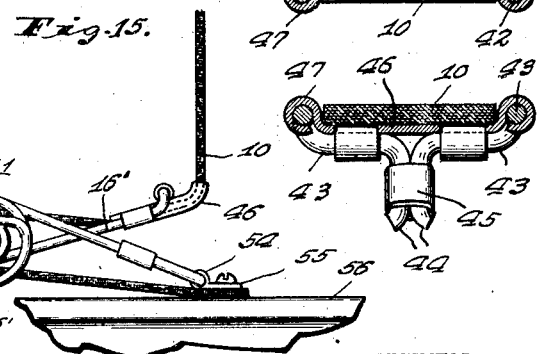

1,636,386

UNITED STATES PATENT OFFICE.

LOUIE H. OBERREICH, OF INDIANAPOLIS, INDIANA.

CUSHION REBOUND CHECK.

Application filed March 5, 1924. Serial No. 697,126.

It is the object of my invention to provide a simple and effective cushion rebound check for automobiles and other vehicles, for cushioning the rebound of the vehicle body with comfort to the passengers; to make such a device that is so easy to install that it can be put on by the ordinary unskilled car-owner, and that does not require any modification of the existing mounting of the vehicle; to provide such a device with a cushioning action which is soft and easy for slight rebounds but is strong and hard for heavy rebounds, with a gradual variation between; and to do all this by a structure which is exceedingly inexpensive.

The accompanying drawing illustrates my invention: Fig. 1 is a fragmentary front elevation of a Ford automobile equipped with a simple form of my cushion rebound check, only one side of the car being shown; Fig. 2 is an enlarged section on the line 2—2 of Fig. 1; Fig. 3 is a still further enlargement of one of the cushion springs of Fig. 1, and of a fragment of the strap, in side elevation, with the spring collapsed; Fig. 4 is a view similar to Fig. 3, but with the spring partly open; Fig. 5 is a section on the line 5—5 of Fig. 3; Fig. 6 is a section on the line 6—6 of Fig. 3; Fig. 7 is a fragmental view similar to Fig. 1, showing my rebound cushion check somewhat differently mounted; Fig. 8 is another view similar to Fig. 1, showing a still different mounting for my cushion rebound check, and also showing it combined with a shock-absorber; Fig. 9 is a view similar to Fig. 3, but on a smaller scale and in section showing my device with anti-friction bearing rollers; Fig. 10 is another view similar to Fig. 3, showing my cushion rebound check combined with a snubber; Fig. 11 is another view similar to Fig. 3, showing a somewhat different spring construction which has certain advantages, and a somewhat different mounting of the spring on the strap, and also a plurality of springs mounted in parallel on the same strap; Fig. 12 is a plan of the spring shown in Fig. 11, with the strap partly broken away; Fig. 13 is a section on the line 13—13 of Fig. 11; Fig. 14 is another view similar to Fig. 3, showing the spring of Figs. 11 and 12 associated with the strap in a somewhat different manner; Fig. 15 is still another view similar to Fig. 3, showing one end of the spring definitely positioned with relation to one of the two parts which the cushion rebound check interconnects; and Fig. 16 is a view similar to Fig. 10 showing the cushion rebound check illustrated in Figs. 11 and 12 in combination with a snubber.

My cushion rebound check has a strap 10, conveniently of woven belting or any other similar flexible material, preferably flat. This strap may be arranged in one or more lengths or stretches. In the arrangement shown in Figs. 1, 2, 7, and 8, this strap has two lengths or stretches, formed by making the strap in a closed loop by overlapping its two ends; but the two-length arrangement, though often desirable, is not necessary, and in the arrangement shown in Fig. 10 there is but one length or stretch of strap. When there are two overlapping ends, they may be fastened together by clamping plates 11 and 12, with two or more clamping bolts 13 co-operating therewith; which provides a simple adjustable clamping means.

Each stretch or length of the strap 10 carries one or more double-armed coil-springs 15 or 15'. In the arrangement shown in Figs. 1, 2, 7, and 8 there is only a single spring on a stretch or length of the strap; but in Fig. 11 is shown an arrangement whereby two springs may be mounted in parallel on the same stretch or length of the strap. Each coil spring consists of a plurality of convolutions, conveniently arranged in the form of one or more helixes, and has two projecting arms 16 or 16' transverse to the spring axis. The two arms of the spring preferably cross each other as shown in Figs. 2, 3, 4, 10, 11, 14, and 15, and at their ends are suitably associated with the strap 10 so that the ends of the arms are pulled apart and the spring is wound upon an increase of tension on the strap.

The actual form of the springs may vary, as may also the mounting of the ends of the spring-arms. In the form of spring shown in Figs. 2, 3, 4, and 9, the spring 15 consists substantially of a simple helix slightly longer than the width of the strap, with the arms 16 projecting from the ends of the helix, and with the free ends of the arms provided with flat eyes 17 which receive and fit fairly closely upon the strap 10. In that form of spring, each eye 15 is formed by suitably bending the wire forming the spring, preferably with the bent wire-end 17' slightly spaced out from the edge of the strap to prevent it from tearing the strap. With this form of spring, the strap 10 at each spring 15 passes through one eye 17, then in a bight 18 around the helical main portion of the spring, and then through the other eye 17. Thus the coil spring 15 is located in a bight 18 of the strap 10. With this mounting of this style of spring, I prefer that the end turns of the coil spring, which end turns lead into the arms 16, shall be offset from the spring axis oppositely from the direction in which the arms 16 project, to provide projections 19 in the nature of lips or flanges for keeping the strap 10 from slipping off such springs endwise thereof, as is clear from Figs. 2, 3, 4, and 5. When there are two lengths of strap 10, as shown in Fig. 2, they are conveniently substantially alike, and each of them has a bight 18 in which there is co-operatively mounted one of the springs 15.

This cushion rebound check is mounted upon the automobile or other vehicle between two parts of the vehicle which tend to separate on rebound; preferably with one cushion rebound check at each corner. For example, the rebound check may extend between a body part, such as the arm 20 of the lamp bracket, and the axle 21, as is illustrated in Figs. 1 and 2. These two things tend to separate when the body rebounds away from the axle. In this mounting, I have shown the closed-loop arrangement of the strap. The two lengths or stretches of the strap 10 extends up side by side from the axle 21 to the lamp-bracket arm 20, and the strap-loop encloses within it both such axle and such arm, as is clear from Fig. 2. When these two parts tend to separate, the two eyes 17 of each of the coil springs 15 are pulled apart, as indicated in Fig. 4; but this pulling apart is resisted by the torsional resilience of the coiled spring 15. Such resistance is light and soft at first, but as the two arms 16 are swung more nearly toward alinement with each other the resistance increases rapidly. This increase in resistance is due to the interaction of three causes: first, the increased torsion of the spring 15; second, the increased friction of the strap in the eyes 17, as the strap slides in the eyes 17 as the arms 16 move relatively to each other, on account of the greater pressure per unit of area by reason of the increased pull; and third, the decrease of effective lever-arm length, as the two arms 16 swing toward alinement with each other. As a result, the resistance is tremendous as the two arms approach alinement. This effectively cushions the rebound of the body of the vehicle away from the axle 21, and makes riding much more comfortable, because the passengers are not thrown from their seats by such rebound.

The mounting of the rebound check between the lamp-bracket arm 20 and the axle 21 as illustrated in Figs. 1 and 2 is merely one example. Instead, the cushion rebound check may be mounted in various other ways. Two such ways are shown in Figs. 7 and 8.

In Fig. 7, the strap 10 is of the closed-loop type and extends around the lamp-bracket arm 20 and the spring 22, which also separate on rebound.

In Fig. 8, the cushion rebound check is mounted to extend obliquely, which has advantages in cushioning side sway. Here the strap 10 at the top extends around or is otherwise attached to the lamp-bracket arm 20, but at the bottom is attached to a suitable loop 23, of wire or other suitable material, which in turn is passed around the perch 24 from which the main spring 22 is hung. This perch 24 in Fig. 8 is shown as reversed, as is commonly the case when the spring 22 is supported from a shock-absorber 25. The nature of the shock-absorber which can be used is immaterial to my invention, as there are many shock-absorbers available; and so I have merely indicated such a shock-absorber fragmentally, without attempting to show the nature thereof. In almost all instances, shock-absorbers have an opening through them which will permit the passage therethrough of the loop 23. By thus combining my cushion rebound check with any suitable shock-absorber 25, I am able to get exceedingly easy riding.

In order to prevent too great movement of the two lengths of the strap 10 with relation to the axle 21, in the closed-loop type of strap, I may provide a spacer 26, as illustrated in Fig. 2. This spacer may be a U-shaped member, of which one of the legs is the clamping plate 12, and the other leg 27 fits against the other length of the strap 10 and is clamped thereto by an attaching plate 28 and clamping screws 29.

Although in the arrangement shown in Figs. 1, 2, 7, and 8, the strap 10 is of the closed-loop type, that is not essential. Instead of the two stretches or lengths of strap provided by the closed-loop type, with a cushion spring 15 in each stretch or length, I may provide some other number of stretches or lengths. For instance, there may be only a single length or stretch of strap, as indicated in Fig. 10; with the two ends of the strap suitably associated with two parts of the vehicle that tend to separate on rebound. In Fig. 10, these two parts are shown as the axle 21 and the body-frame 30. The attachment of the strap-ends may be direct, as to the axle 21 at the lower end, or indirect, as to the body-frame 30 at the top. As shown, this indirect connection at the upper end of the strap 10 is through a snubber or frictional rebound-resister 31, of well-known structure, and the strap 10 of my cushion rebound check is the strap of such snubber. Within the casing of the snubber, the strap 10 is wound up in a spiral, around two curved shoes 32 which a compression spring 33 tends to force apart; so that when the strap 10 is slackened outside by the coming together of the axle and body-frame the spring 33 separates the shoes to draw the slackened strap into the snubber casing; while when the axle and body-frame tend to separate on rebound the friction of the coils of the strap on each other resists such rebound. With my cushion rebound check thus combined with a snubber, in series relation, the spring 15 wholly takes the easy rebound shocks, and resists all rebounds initially and with gradually increasing force until the arms 16 approach sufficiently close to alinement to start to pull the strap 10 out of the snubber casing. This avoids the usual sudden rebound checking of the snubber, by starting all rebound checking gradually, and lessens wear on the snubber by relieving it of action on easy rebounds.

Devices embodying the combination of my spring with a frictional rebound resister such as shown in Figs. 10 and 16 are described at somewhat greater length and claimed in my co-pending application Serial No. 199,484, filed June 17, 1927.

In order to lessen wear on the straps 10, I may provide the coil-spring 15 with a sheet-metal casing 35 against which the strap 10 bears, as shown in Fig. 9. This casing 35 may be or may not be rotatable on the coil-spring as desired. Also, as also shown in Fig. 9, I may provide sheet-metal sleeves 36 on the bars of the eyes 17, to reduce sliding friction on the strap at the eyes.

In the foregoing I have described my invention in connection with the simple spring-form 15, although indicating that it was merely one form the spring might take. Another and very desirable form is the form shown in Figs. 11, 12, 13, and 15. Here the helical part of the spring takes the form of two oppositely wound alined inner helixes 40, which are close together at their adjacent ends and at their outer ends lead into the outer ends of two outer helixes 41, also wound oppositely to each other, which surround the outer end portions of the adjacent inner helixes 40. The closely adjacent end-turns of the two inner helixes 40 lead into and are continuations of the end of a U-shaped member 42 which forms one of the arms 16′, the base of such U-shaped member being wide enough to extend across the strap 10, while the two arms of the U converge (Fig. 12) so that they nearly meet at the point where they lead into the adjacent end-turns of the inner helixes 40. The adjacent ends of the outer helixes 41 are preferably separated by a distance slightly greater than the width of the strap 10, so that such strap may lie between the two outer helixes 41, thus permitting the inner helixes 40 to lie in the bight of such strap. Thus the outer helixes 41 serve to prevent the strap from slipping off the inner helixes, somewhat as do the lip-turns 19 shown in Figs. 2, 3, and 4. The spaced-apart adjacent end-turns of the two outer helixes 41 lead into two fingers 43, which together constitute the other arm 16′. The outer ends of the fingers 43 are bent toward each other across the strap 10, and are there preferably conveniently fastened together, as by having down-turned ends 44 around which is a clamping collar 45 (Fig. 13).

The arms 16′ formed by the U-shaped member 42 and the arms 43 cross each other much as do the arms 16, as is clear from Fig. 11, and suitably co-operate with the strap 10. While this may be a simple sliding co-operation, in the same manner as illustrated for the eyes 17 in Figs. 3 and 4, it is frequently desirable to provide curved bearing plates 46, U-shaped in cross section, for providing greater bearing surface against the strap, as is clear from Figs. 11, 12, and 13. These bearing plates are preferably curved to reduce wear where the straight part of the strap bends into the bight, as is clear from Figs. 11 and 15. The bearing plates 46 are preferably attached fairly rigidly to the arms 16′, as by clamping ears 47 which are punched out of the sheet-metal of which the clamping plates are formed and suitably grip the cross-bars and the adjacent parts of the side-bars of such arms 16′.

The operation of the cushion rebound check having the spring just described is quite similar to that of the one shown in Figs. 2, 3, and 4. When the two parts separate which are interconnected by the cushion rebound check, the arms 16′ are swung relatively to each other, in the direction to wind up all the helixes 40 and 41; thus increasing the spring resistance of such helixes. Further, the effective lever-arm lengths of the arms 16′ are diminished as the arms move toward alinement with each other. There is some sliding of the strap in the bearing plates 46; which further resists separation of the parts connected by my cushion rebound check, and which also increases as such separation continues. This rebound check shown in Figs. 11 and 12 may be mounted in any of the ways shown for the simpler form, as for instance in the way shown in Figs. 1, 2, 7, 8, and 10.

If desired, two springs may be mounted in parallel on the same length or stretch of the strap. I have indicated this in Fig. 11.

Here one of the springs 15′ is mounted as described in a bight 18 of the strap 10; and another is mounted in a bight of a short length of strap 48, the two ends of which beyond the bight lie against the main length of the strap 10 beyond the bight 18 therein, and are suitably fastened to the main strap 10, as by clamping plates 49 and clamping bolts 50. With this arrangement, where the two vehicle parts connected by the rebound check are separated, the two springs operate in substantially the same manner as above described for one of them, and each takes substantially half the rebound load on the main length of strap 10.

While in many instances I prefer that the coil part of the spring 15 or 15′ shall be in a bight 18 of the strap 10, and while that has some advantages, yet it is not essential to my invention in its broader aspect. I have shown a spring-mounting in Fig. 14 whereby the spring 15′ is not in a bight of the strap 10. In this arrangement, the outer ends of the arms 16′ are pivotally mounted in eyes 51 of clamping plates 52 suitably attached to the strap 10 at a predetermined distance apart, to provide a bight 53 between the clamping plates 52. The bight 53, however, does not have the spring 15′ within it; but it and the springs 15′ lie on opposite sides of the plane of the strap. The plates 52 are so located on the strap 10 that the bight 53 is straightened out when the arms 16′ have swung apart to a predetermined angle, as indicated in dotted lines in Fig. 14. This limits the possible pull on the springs 15′, for when the bight 53 is straightened out it acts as a positive rebound check, and thus limits the spreading apart of the arms 16′.

In all the spring-mountings so far described, the ends of both arms 16′ have been directly associated with the strap 10, and have been separated from the vehicle parts which my cushion rebound check interconnects. While this is often desirable, it is not essential to my broad invention. In Fig. 15 I have shown a mounting in which one arm 16′ is mounted through a bearing plate 46 on an intermediate portion of the strap 10, in the manner already described; but the end of the other arm is mounted in an eye 54 of a clamping plate 55 which is directly attached to the axle 56 and conveniently serves also to clamp the lower end of the strap 10 to such axle. The operation of the device with this mounting is substantially the same as that already described.

In any of the types of springs shown, a bolt 60 may be inserted axially through the spring helix. This is illustrated in Fig. 14. This bolt serves to prevent undue distortion of the coil; especially if the bight of the strap bunches or is made too long, and in consequence a straightening of the bight fails to limit the separation of the ends of the arms 16 or 16′. Such a bolt 60 is especially advantageous in the type of spring shown in Figs. 11 to 15, because it also holds the two helixes 40 in line.

I claim as my invention:—

1. A cushion rebound check, comprising a strap arranged to extend between two parts of a vehicle which tend to separate on rebound, said strap being provided with a lateral bight, and a coil spring seated in said bight and having projecting arms which at their ends have sliding frictional engagement with the strap at the ends of the bight.

2. A cushion rebound check, comprising a strap arranged to extend between two parts of a vehicle which tend to separate on rebound, said strap being provided with a lateral bight, and a coil spring seated in said bight and having projecting arms which at their ends have sliding frictional engagement with the strap at the ends of the bight, the two ends of said arms being provided with bearing parts extending across the strap at the bight-ends.

3. A cushion rebound check, comprising a strap arranged to extend between two parts of a vehicle which tend to separate on rebound, said strap being provided with a lateral bight, two arms which frictionally engage the ends of said bight and are interconnected by a part seated in the base of the bight, said two arms being resiliently pressed together to move the bight ends toward each other.

4. A cushion rebound check, comprising a strap arranged to extend between two parts of a vehicle which tend to separate on rebound, said strap being provided with a lateral bight, and a spring acting between the two ends of said bight and tending to pull them together.

5. A cushion rebound check, comprising a strap arranged to extend between two parts of a vehicle which tend to separate on rebound, said strap being provided with a lateral bight, and a coil spring seated in said bight and having projecting arms which at their ends have sliding frictional engagement with the strap at the ends of the bight, the end turns of said coil spring being offset to provide retaining flanges for the straps.

6. A cushion rebound check, comprising a strap arranged to extend between two parts of a vehicle which tend to separate on rebound, said strap being provided with a lateral bight, and two arms which engage the ends of said bight, said two arms being resiliently pressed together to move the bight ends toward each other.

7. A cushion rebound check, comprising a strap arranged to extend between two parts of a vehicle which tend to separate on rebound, said strap being provided with a lateral bight, and two arms which frictionally engage the ends of said bight, said two arms being resiliently pressed together to move the bight ends toward each other, and the bight being of such length that it straightens out to limit the opening of said arms.

8. A cushion rebound check, comprising a coiled spring having two laterally extending arms, said two arms being interconnected with two parts of a vehicle which tend to separate on rebound, so that upon said separation the winding of the coil is varied by such movement of the arms, and means for limiting the relative movement of said arms.

9. A cushion rebound check, comprising a coiled spring having two laterally extending arms, said two arms being interconnected with two parts of a vehicle which tend to separate on rebound, so that upon said separation the winding of the coil is varied by such movement of the arms, said coil consisting of two helixes in approximate alinement, with the adjacent ends of said helixes interconnected with one arm, and with the remote ends of said helixes interconnected with the other arm.

10. A cushion rebound check, comprising a coiled spring having two laterally extending arms, said two arms being interconnected with two parts of a vehicle which tend to separate on rebound, so that upon said separation the winding of the coil is varied by such movement of the arms, said coil consisting of two helixes in approximate alinement, with the adjacent ends of said helixes interconnected with one arm, and with the remote ends of said helixes interconnected with the other arm, and means for limiting the relative movement of said arms.

11. A wire torsion spring, comprising two co-axial internal, helical portions, a laterally extending arm formed by a loop the two legs of which are continuous with the inner ends of said internal helical portions, external helical portions surrounding said inner helical portions and joined thereto at the outer ends thereof, the wire-ends from said external helixes extending laterally to form a second arm.

12. A spring as set forth in claim 11 with the addition of a stiffening rod extending axially within said internal helixes.

13. A wire torsion spring, comprising an inner helical portion and an outer helical portion, one end of said outer helical portion being joined to the corresponding end of said inner helical portion, the wire-ends from the free ends of said two helical portions extending laterally to form arms.

14. A wire torsion spring, comprising an inner helical portion and an outer helical portion, one end of said outer helical portion being joined to the corresponding end of said inner helical portion.

15. A wire torsion spring, comprising two co-axial inner helical portions, an outer helical portion surrounding each of said inner helical portions, one end of each of said outer helical portions being joined to the corresponding end of its associated inner helical portion, the wire-ends from the free ends of said two outer helical portions extending laterally to form an arm and the wire-ends from the free ends of said two inner helical portions extending laterally to form a second arm.

16. A wire torsion spring, comprising two co-axial inner helical portions, an outer helical portion surrounding each of said inner helical portions, one end of each of said outer helical portions being joined to the corresponding end of its associated inner helical portion.

In witness whereof, I have hereunto set my hand at Indianapolis, Indiana, this 1st day of March, A. D. one thousand nine hundred and twenty-four.

LOUIE H. OBERREICH.